United States Patent
Yi et al.

(10) Patent No.: US 7,667,677 B2
(45) Date of Patent: Feb. 23, 2010

(54) LIQUID CRYSTAL MODULE

(75) Inventors: Chien-Yu Yi, Gueishan Township, Taoyuan County (TW); Wen-Fong Lin, Gueishan Township, Taoyuan County (TW)

(73) Assignee: AU Optronics Corp., Hsinchu (TW)

( * ) Notice: Subject to any disclaimer, the term of this patent is extended or adjusted under 35 U.S.C. 154(b) by 623 days.

(21) Appl. No.: 11/353,526

(22) Filed: Feb. 14, 2006

(65) Prior Publication Data

US 2006/0244708 A1    Nov. 2, 2006

(30) Foreign Application Priority Data

Apr. 27, 2005    (TW) ............... 94113451 A

(51) Int. Cl.
G09G 3/36    (2006.01)
(52) U.S. Cl. .................. 345/87; 345/92; 345/100; 345/204; 349/42
(58) Field of Classification Search .......... 345/87, 345/92, 100, 205, 204; 438/396, 638; 257/534; 349/42

See application file for complete search history.

(56) References Cited

U.S. PATENT DOCUMENTS

| | | | | |
|---|---|---|---|---|
| 6,320,244 B1 * | 11/2001 | Alers et al. | ................. | 257/534 |
| 6,346,454 B1 * | 2/2002 | Sung et al. | ................. | 438/396 |
| 6,462,723 B1 * | 10/2002 | Yamazaki et al. | ............. | 345/82 |
| 6,517,483 B2 * | 2/2003 | Park et al. | ................. | 600/398 |
| 6,657,622 B2 * | 12/2003 | Park | ......................... | 345/205 |
| 6,771,248 B2 * | 8/2004 | Tanaka et al. | ............... | 345/100 |
| 2002/0008682 A1 | 1/2002 | Park | | |
| 2003/0001808 A1 * | 1/2003 | Sakuma et al. | ................. | 345/87 |
| 2003/0030604 A1 * | 2/2003 | Moon et al. | .................... | 345/87 |
| 2003/0043100 A1 * | 3/2003 | Moon | ......................... | 345/87 |
| 2003/0103027 A1 * | 6/2003 | Kim et al. | ...................... | 345/87 |
| 2003/0109132 A1 * | 6/2003 | Lee | ............................ | 438/638 |
| 2003/0227430 A1 * | 12/2003 | Chiang et al. | ................. | 345/92 |
| 2004/0246427 A1 | 12/2004 | Iwanaga et al. | | |
| 2004/0252112 A1 * | 12/2004 | Fukuda et al. | ............. | 345/204 |

FOREIGN PATENT DOCUMENTS

| | | |
|---|---|---|
| CN | CN1499472 | 5/2004 |
| JP | 4082331 | 3/1992 |

OTHER PUBLICATIONS

CN Office Action mailed Nov. 2, 2007.
CN Office Action mailed Feb. 1, 2008.
China Office Action mailed Jun. 1, 2007.

* cited by examiner

Primary Examiner—Amare Mengistu
Assistant Examiner—Premal Patel
(74) Attorney, Agent, or Firm—WPAT., P.C.; Justin King

(57) ABSTRACT

A liquid crystal module for flat panel display comprising a glass substrate, a plurality of source drivers, a control board, and at least one bus. The source drivers coupled to the glass substrate utilize the chip on glass (COG) technology. The control board receives a plurality of data signals, a power signal and a gamma correction signal. The at least one bus coupled to the control board and at least one source driver, passes the data signals, the power signal and the gamma correction signal. The source drivers couple to the control board via the bus, each receiving a corresponding data signal. The data signals, conforming to transistor-transistor logic (TTL) standard, are transmitted sequentially on the bus.

3 Claims, 7 Drawing Sheets

LIQUID CRYSTAL MODULE

BACKGROUND OF THE INVENTION

1. Field of the Invention

The invention relates to liquid crystal display, and in particular, to a liquid crystal module (LCM) for use in a flat panel display.

2. Description of the Related Art

FIG. 1 shows a conventional liquid crystal module. The liquid crystal module comprises a glass substrate 102, a source control board 104 and a gate control board 108. The source control board 104 couples to the glass substrate 102 via a plurality of source drivers 110 disposed therebetween, and the gate control board 108 couples to the glass substrate 102 via a plurality of gate drivers 106 disposed therebetween. The glass substrate 102 comprises a pixel circuit array (not shown) driven by the source drivers 110 and gate drivers 106 to present an image. The source drivers 110 and gate drivers 106 each receive corresponding data signals from the source control board 104 and gate control board 108 to control the image displayed on glass substrate 102. The gate driver 106 and source driver 110 are packaged by Tape Carrier Package (TCP) and Chip on Film (COF) technologies. TCP and COF are the major technologies for packaging the chips in a liquid crystal module. These films are soft and flexible, thus disposing both passive components and drivers together on one film is very convenient and cost effective.

FIG. 2 shows another conventional liquid crystal module. The liquid crystal module comprises a glass substrate 202 and source control board 204 coupled via a plurality of flexible printed circuits (FPCs) 208 disposed therebetween. The source control board 204 transfers data signals into the liquid crystal module for image display. A plurality of gate drivers 206 and source drivers 210 are disposed on the glass substrate 202 by the chip on glass (COG) technology. The source control board 204 receives the data signals through the FPC 208. The COG technology utilizes Flip Chip technology to couple a chip on a glass substrate, and the chip is grown with metal bumps utilized for contact with circuits. The FPC 208 is a printed circuit made with soft insulation materials, comprising a plurality of capabilities such as bending, rolling and stacking at will. Thus the FPC 208 is suitable for compact digital products having high circuit density, and the implementation is very easy and cost effective.

BRIEF SUMMARY OF INVENTION

A detailed description is given in the following embodiments with reference to the accompanying drawings.

An exemplary embodiment of liquid crystal modules for a flat panel display comprises: a glass substrate, a plurality of source drivers, a control board, and at least one bus. The source drivers coupled to the glass substrate utilize the chip on glass (COG) technology. The control board receives a plurality of data signals, a power signal and a gamma correction signal. At least one bus coupled to the control board and a source driver, for passing the data signals, the power signal and the gamma correction signal. The source drivers couple to the control board via the at least one bus, each receiving a corresponding data signal. The data signals, conforming to the transistor-transistor logic (TTL) standard, are transmitted sequentially on the bus.

The at least one bus may be a flexible printed circuit (FPC), and the control board may be a flexible printed circuit or a printed circuit. The at least one bus may comprise a first bus and a second bus. The source drivers are divided into a first group and a second group. The first bus couples the control board to the first group of source drivers. The second bus couples the control board to the second group of source drivers. The first and second group of source drivers, receiving the data signals, the power signal and the gamma correction signal via the first and second bus respectively.

The liquid crystal module may further comprise a plurality of sub-channels, each coupling to two adjacent source drivers. The glass substrate comprises a plurality of glass channels, each coupling to two adjacent source drivers. The bus at least one couples the control board to one of the source drivers. The transmission of corresponding data signals, from the control board to the corresponding source drivers via the at least one bus and the plurality of glass channels, may conform to the point to point (P2P) standard. The power signal and the gamma correction signals are delivered from the control board to the corresponding source drivers via the at least one bus and the a plurality of sub-channels. The sub-channel may also be a flexible printed circuit. The glass channel may be a dual damascene structure, layered with materials having resistance not exceeding 2 µΩcm.

BRIEF DESCRIPTION OF DRAWINGS

The following detailed description, given by way of example and not intended to limit the invention solely to the embodiments described herein, will best be understood in conjunction with the accompanying drawings, in which.

DETAILED DESCRIPTION OF INVENTION

Figure 1:
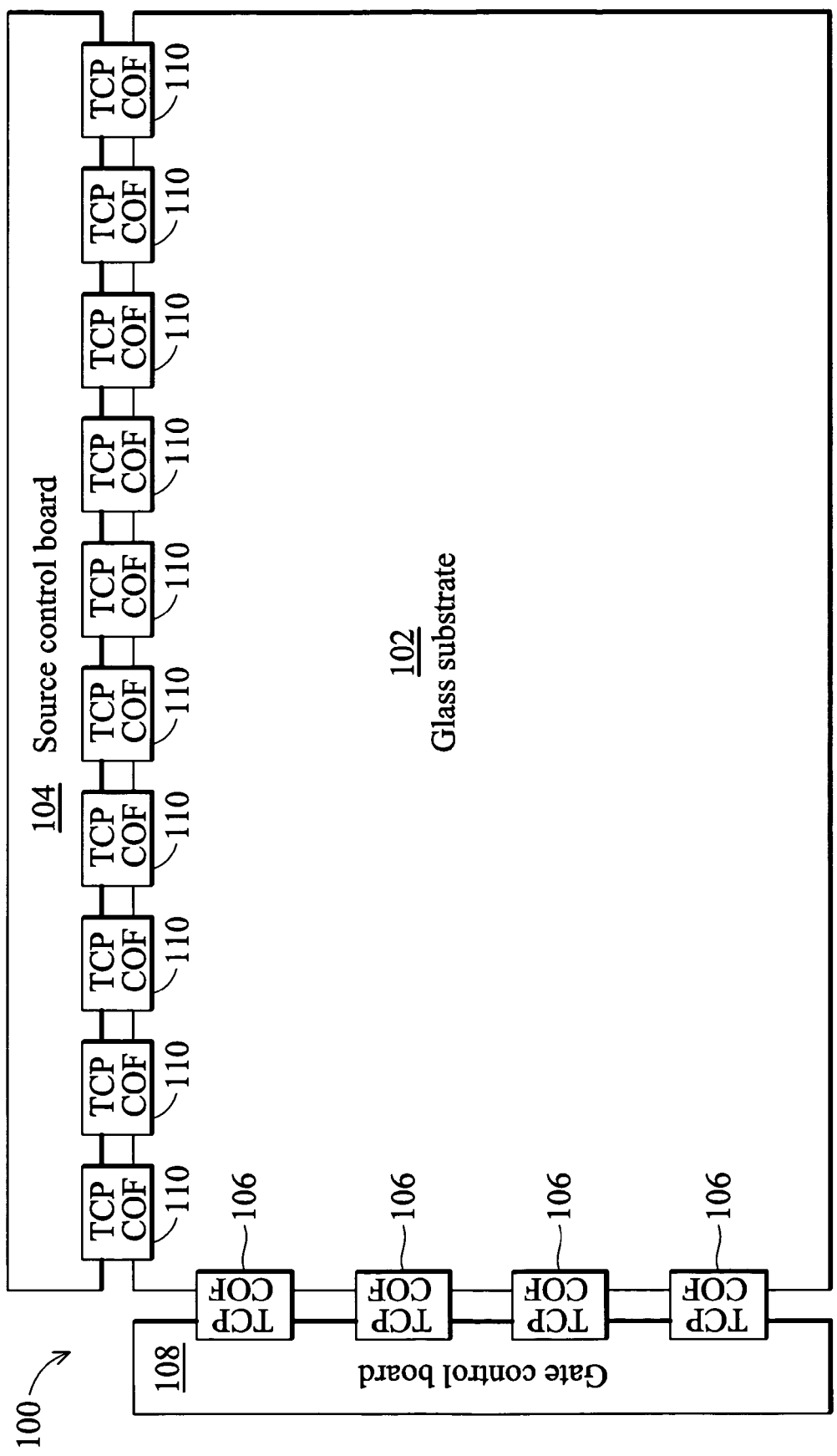
FIG. 1 shows a conventional liquid crystal module.
Figure 2:
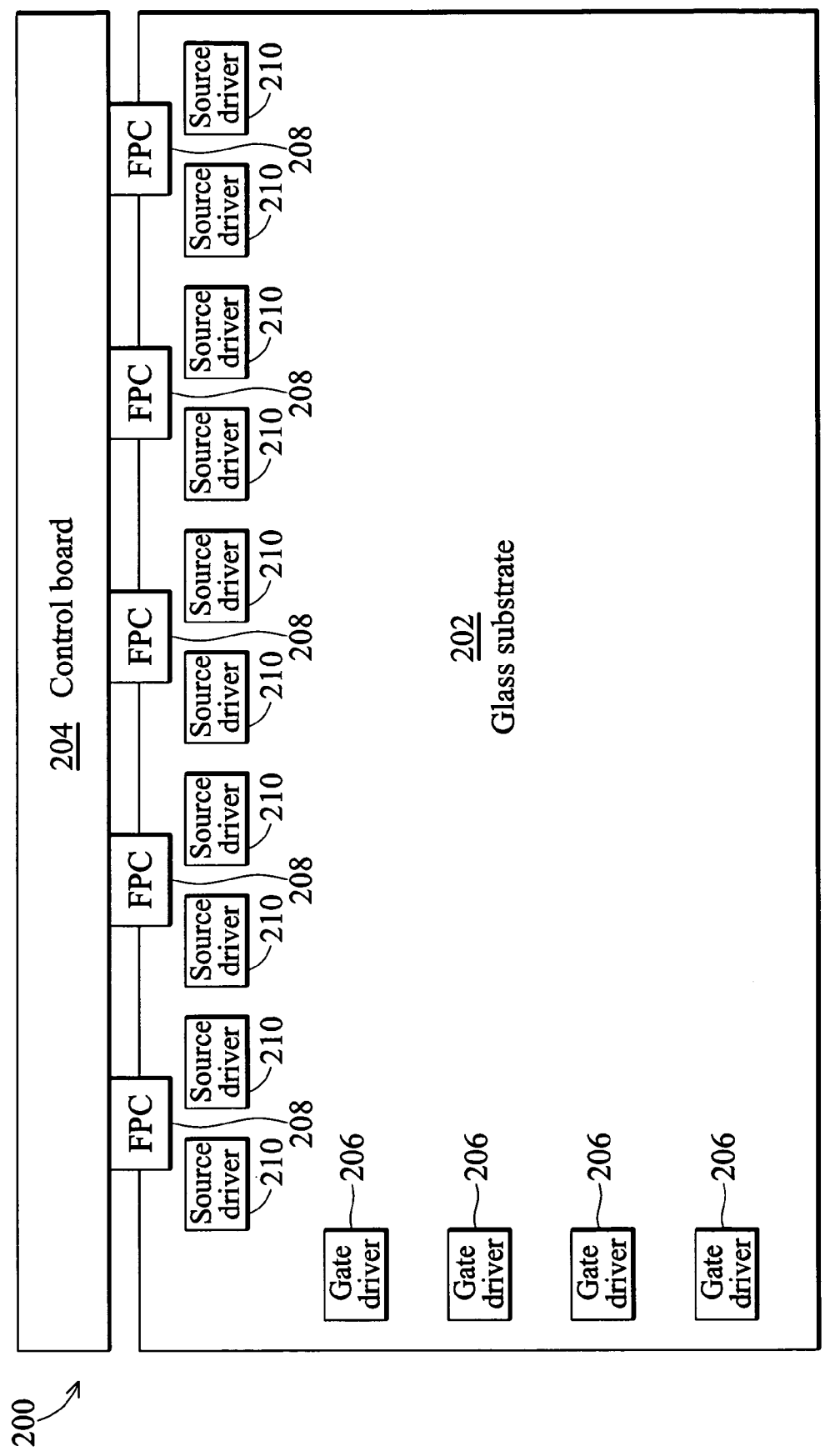
FIG. 2 shows another conventional liquid crystal module.
Figure 3A:
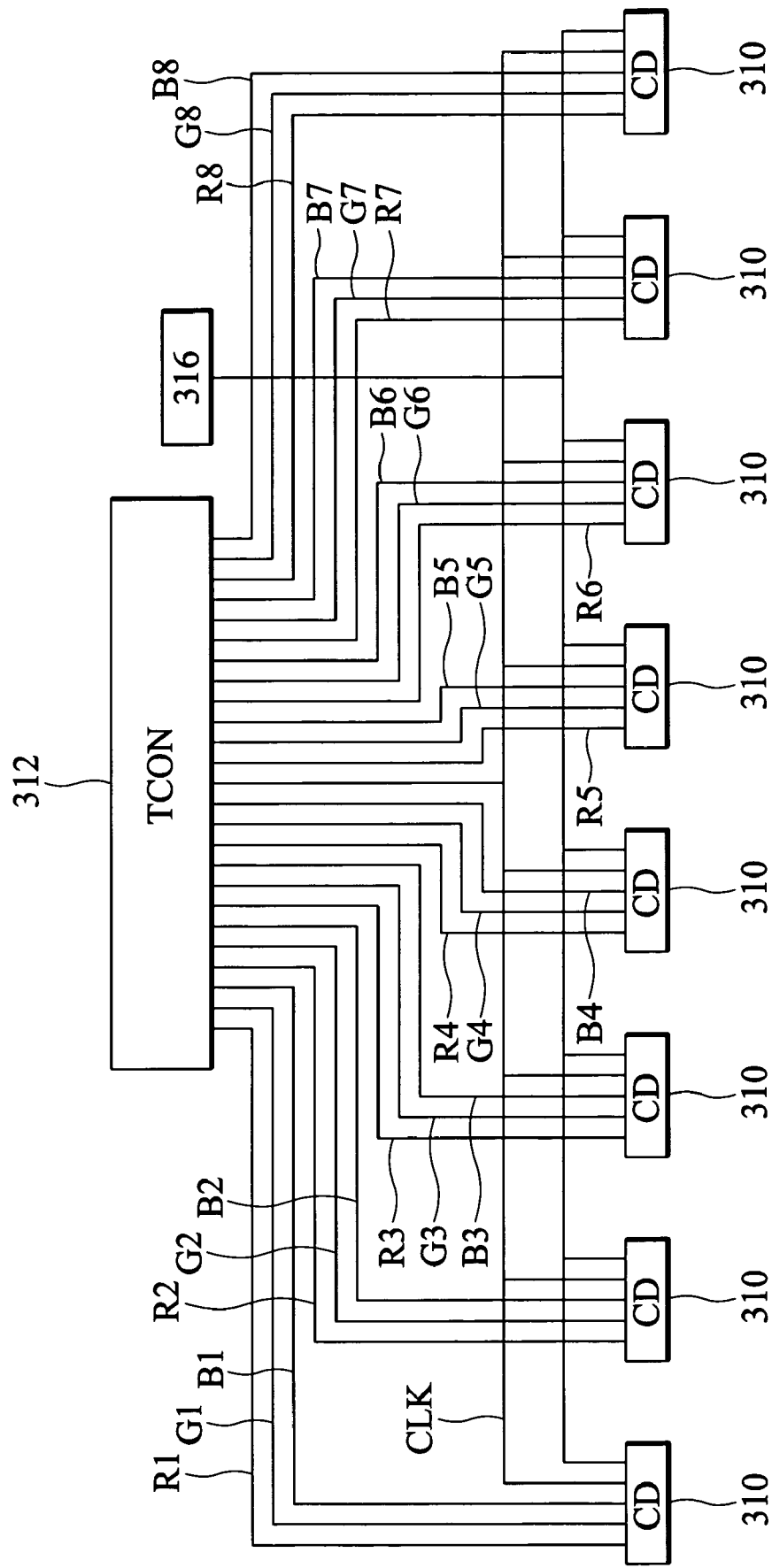
FIG. 3a shows a point-to-point structure of the liquid crystal module.

FIG. 3a shows a point-to-point structure of the liquid crystal module. The liquid crystal module comprises eight source drivers 310 each comprising a set of RGB lines coupled to the timing controller 312. Each set of RGB lines are a red line, a green line, and a blue line, therefore the total lines are R1, G1, B1 to R8, G8, B8, each conducting one corresponding data signal to a source driver 310. The data signals conform to the transistor-to-transistor logic (TTL) standard. For example, the data signals may be CMOS signals. The timing controller 312 further delivers a sync clock to each control board 304 through a clock line. Additionally, the liquid crystal module comprises a gamma lookup table 316 for transmitting gamma correction signals to each control board 304.

Figure 3B:
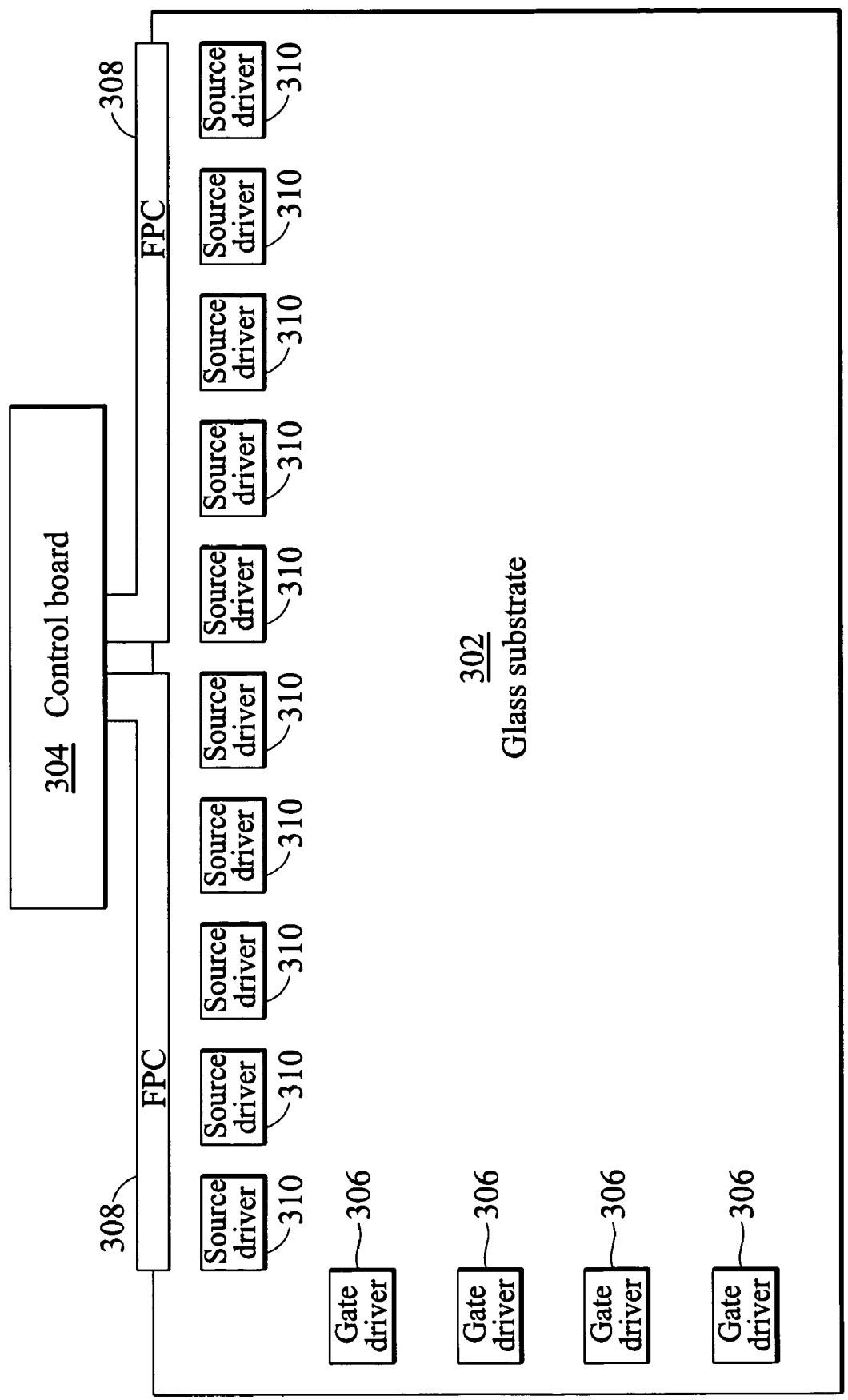
FIG. 3b shows an embodiment of the liquid crystal module.

FIG. 3b shows an embodiment of the liquid crystal module specifically implementing the point-to-point architecture in FIG. 3a. A plurality of gate drivers 306 and source drivers 310 are embedded on the glass substrate 302 utilizing the COG technology. A control board 304 couples to the glass substrate 302 via two FPC 308, for controlling the left four and right four source drivers 310. The control board 304 transfers data signals generated by the timing controller 312 in FIG. 3a, gamma correction signals generated by the gamma lookup table 316, and power signals (not shown) necessary for the circuits, into the liquid crystal module. The two FPCs 308 are based on the point-to-point architecture shown in FIG. 3a, such that each source driver 310 couples to the timing controller 312 in FIG. 3a through individual wires. The data signals transferred on the wires conform to the TTL standard, thus lowering power consumption and electromagnetic interference (EMI), and gaining better performance for the liquid crystal module.

Figure 4:
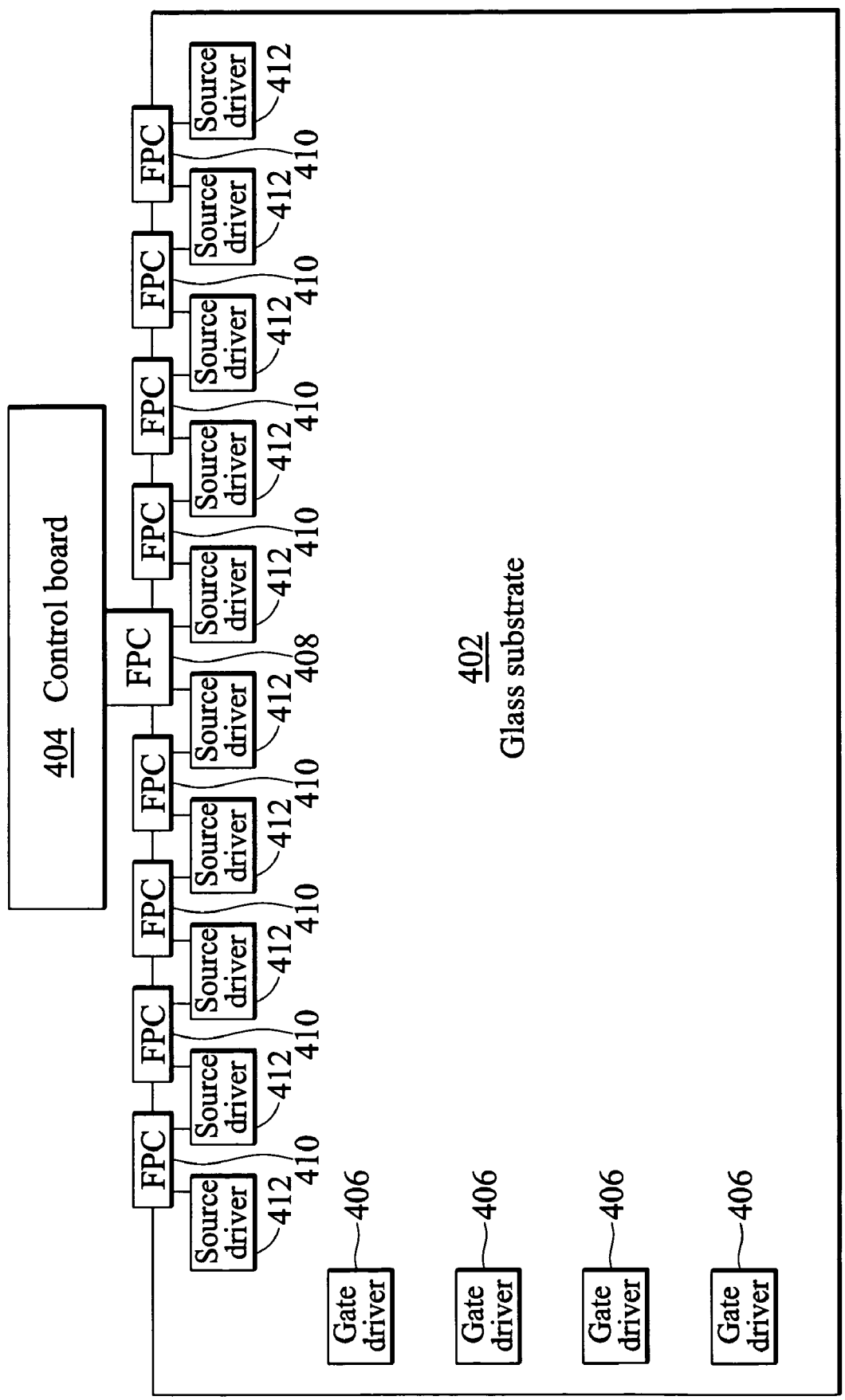
FIG. 4 shows another embodiment of the liquid crystal module.

FIG. 4 shows another embodiment of the liquid crystal module. A plurality of gate drivers 406 and source drivers 412 are embedded on the glass substrate 402 using COG technology. A control board 404 couples to the glass substrate 402 through a FPC 408. Each source driver 412 cascades with the adjacent source driver 412 by FPCs 410, and two of the source drivers 412 nearest the FPC 408, are coupled to the FPC 408, thereby forming a physical path for delivery of data signals from the control board 404 to each source driver 412. The physical path comprises wirings conforming to the point-to-point architecture in FIG. 3a, therefore each FPC 410 is specifically designed to transfer and forward corresponding signals for successive source drivers 412. FPCs 410 are utilized to transfer power signals and gamma correction signals due to their excellent conductivity. Contrary to the embodiment in FIG. 3b, the point-to-point data signals are transferred via on panel wirings (not shown) deployed on the glass substrate 402, thus the number of required FPCs 410 can be reduced.

Figure 5A:
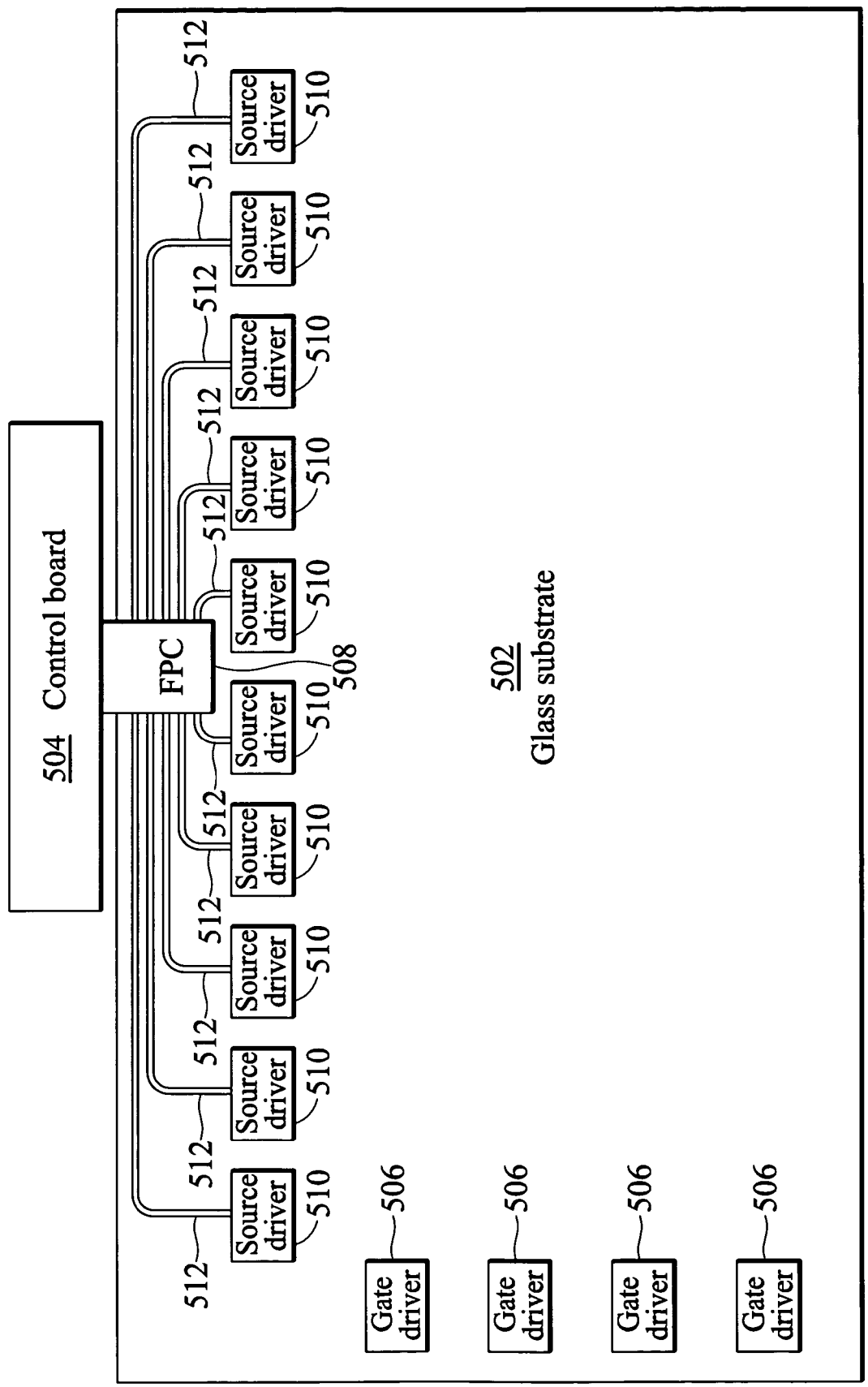
FIGS. 5a and 5b show further embodiments of the liquid crystal module.

FIG. 5a shows another embodiment of the liquid crystal module. A plurality of gate drivers 506 and source drivers 510 are embedded on a glass substrate 502 using COG technology. One FPC 508 couples the control board 504 and the glass substrate 502 for transferring point-to-point data signals, power signals and gamma correction signals from the control board 504.

All the wirings for transferring the signals are implemented on the glass substrate 502 by a copper process or a low-k process, referred to as a glass channel 512. Conventional wirings suffer from signal distortion due to high resistance. The copper process or low-k process provide good conductivity, thus the signal quality increases significantly. By using copper instead of aluminum, integrated circuit performance increases by 30 to 40 percent. In this embodiment, a wiring structure referred to as "dual damascene" may be adopted to implement the copper process, thus the complexity of the implementation can be reduced. In a conventional process, circuit patterns are first etched on a metal film, and dielectric materials are then filled around the circuit patterns. In the dual damascene process, the circuit patterns are etched on a dielectric film, and metals are then filled into the etched recesses. In comparison, the copper has a resistance of 2 μωcm, better than the aluminum's 4 μωcm.

Figure 5B:
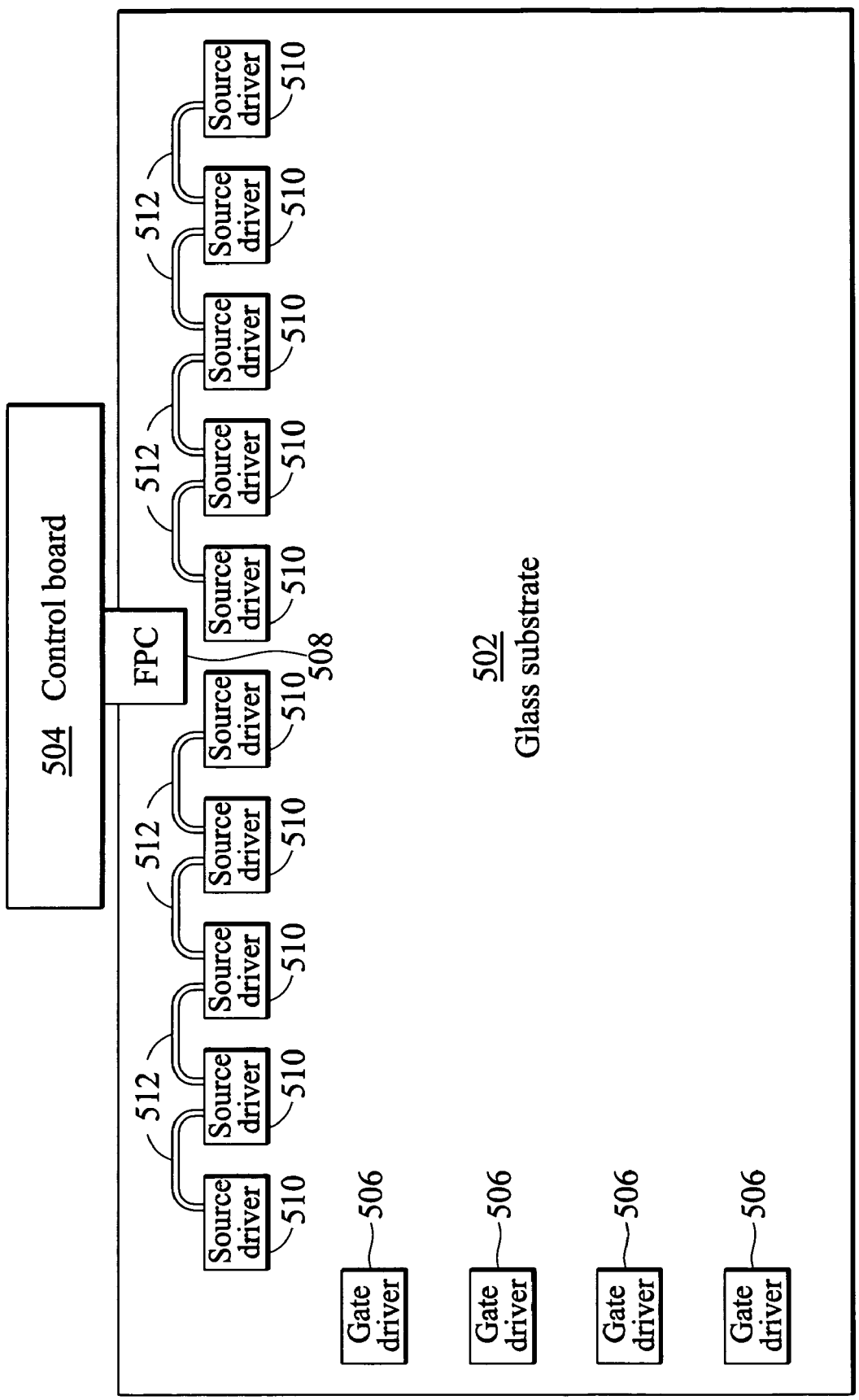

FIG. 5b shows another embodiment of the liquid crystal module. In FIG. 5b, two source drivers 510 being closest to the FPC 508 are coupled to the FPC 508, and the other source drivers 510 are cascaded in serial by the glass channels 512. The two source drivers 510 provide relay function to relay signals for successive source drivers 510, thus reducing the need for glass channels and implementation complexity.

While the invention has been described by way of example and in terms of the preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid crystal module for a flat panel display, comprising:
    a glass substrate;
    a control board, receiving a plurality of data signals, a power signal, and a gamma correction signals;
    a first flexible printed circuit (FPC) located at said glass substrate's outer boundary;
    a second FPC located at said glass substrate's outer boundary;
    a third FPC located at said glass substrate's outer boundary;
    a fourth FPC located at said glass substrate's outer boundary;
    a fifth FPC located at said glass substrate's outer boundary;
    a first source driver, coupled to said glass substrate utilizing chip on glass (COG) technology;
    a second source driver, coupled to said glass substrate utilizing COG technology;
    a third source driver, coupled to said glass substrate utilizing COG technology;
    a fourth source driver, coupled to said glass substrate utilizing COG technology;
    wherein said control board connects to said glass substrate via said first FPC, said first FPC connects to said second FPC via said first source drive, said first source drive connects to said second source drive via said second FPC, said second FPC connects to said third FPC via said second source drive, and said third FPC connects said fourth FPC via said third source drive; said third source drive connects to said fourth source drive via said fourth FPC; and said fourth FPC connects to said fifth FPC via said fourth source drive.

2. The liquid crystal module as claimed in claim 1, wherein the glass substrate comprises a plurality of channels implemented on the glass substrate by a copper process or a low-k process.

3. The liquid crystal module as claimed in claim 2, wherein one of the channels is a dual damascene structure, layered with materials having resistance not exceeding 2 μΩcm.

* * * * *